(12) United States Patent
Fukuhara

(10) Patent No.: US 8,072,415 B2
(45) Date of Patent: Dec. 6, 2011

(54) CONTROL SIGNAL INPUT SYSTEM AND CONTROL SIGNAL INPUT METHOD

(75) Inventor: Hiroshige Fukuhara, Tokyo (JP)

(73) Assignee: Sony Corporation (JP)

( * ) Notice: Subject to any disclaimer, the term of this patent is extended or adjusted under 35 U.S.C. 154(b) by 913 days.

(21) Appl. No.: 11/355,389

(22) Filed: Feb. 16, 2006

(65) Prior Publication Data

US 2006/0192753 A1    Aug. 31, 2006

(30) Foreign Application Priority Data

Feb. 17, 2005 (JP) ................................ P2005-041163

(51) Int. Cl.
*G09G 5/00* (2006.01)

(52) U.S. Cl. .......... 345/156; 345/169; 345/173; 341/20; 463/37

(58) Field of Classification Search .................. 345/156, 345/173–175, 168, 169; 715/700; 341/20–22; 463/37, 38
See application file for complete search history.

(56) References Cited

U.S. PATENT DOCUMENTS

| | | | | |
|---|---|---|---|---|
| 3,795,882 A | * | 3/1974 | Tokubo | 338/128 |
| 5,831,597 A | * | 11/1998 | West et al. | 345/163 |
| 5,841,372 A | * | 11/1998 | Matsumoto | 341/20 |
| 6,243,076 B1 | * | 6/2001 | Hatfield | 345/156 |
| 6,448,987 B1 | * | 9/2002 | Easty et al. | 715/834 |
| 6,805,020 B2 | * | 10/2004 | Onodera | 74/471 XY |
| 2002/0149566 A1 | * | 10/2002 | Sarkissian | 345/168 |
| 2003/0076306 A1 | * | 4/2003 | Zadesky et al. | 345/173 |
| 2009/0135150 A1 | * | 5/2009 | Takashima et al. | 345/173 |

FOREIGN PATENT DOCUMENTS

| | | |
|---|---|---|
| JP | 2-096496 A | 4/1990 |
| JP | 6-078381 A | 3/1994 |
| JP | 7-049241 A | 2/1995 |
| JP | 7-201256 A | 8/1995 |
| JP | 7-296670 A | 11/1995 |
| JP | 10-214543 A | 8/1998 |
| JP | 11-252405 A | 9/1999 |
| JP | 2001-184158 A | 7/2001 |
| JP | 2002-330307 A | 11/2002 |
| JP | 2003-274298 A | 9/2003 |
| JP | 2003-291739 A | 10/2003 |

* cited by examiner

*Primary Examiner* — Lun-Yi Lao
*Assistant Examiner* — Insa Sadio
(74) *Attorney, Agent, or Firm* — Lerner, David, Littenberg, Krumholz & Mentlik, LLP

(57) ABSTRACT

Disclosed herein is an interface which users can intuitively operate. A control signal input system includes a display device which displays a graphical user interface including plural control items for controlling a device, the control items being displayed in a predetermined layout; and an input device having an input unit operable to make a selection from control items displayed on the display device, the input unit having a shape, wherein the shape of the input unit corresponds to the layout of the control items.

12 Claims, 12 Drawing Sheets

CONTROL SIGNAL INPUT SYSTEM AND CONTROL SIGNAL INPUT METHOD

CROSS-REFERENCE TO RELATED APPLICATIONS

The present application claims priority from Japanese Patent Application No. JP 2005-041163 filed on Feb. 17, 2005, the disclosure of which is hereby incorporated by reference herein.

BACKGROUND OF THE INVENTION

The present invention relates to a control signal input system and a control signal input method for inputting control signals of electronic devices.

Many of conventional home-use AV (audio visual) devices are equipped with remote controllers. Remote controllers transmit remote control signals to the bodies of the AV devices by means of infrared rays. Users can control switching of channels and increase/decrease of sound volume from remote places from the AV devices.

A remote controller is ordinarily provided with plural buttons on the surface thereof. For example, a television remote controller is provided with buttons such as channel buttons, volume buttons, and video switches. The buttons one-to-one correspond to contents of operations. When a button of channel 1 is selected, the screen switches to the channel 1. When a button to increase sound volume is selected, the volume increases. This kind of input/select scheme is called a push-type selection scheme. With push-type remote controllers, AV devices can be operated simply by selecting buttons. Therefore, even users who are weak in machines can easily operate AV devices (e.g., see Jpn. Pat. Appl.n Laid-Open Publication No. 2003-274298).

In recent years, AV devices have become more multifunctional. A television disclosed in the publication No. 2003-274298 is added with a function to select automatically a genre of a broadcasting program. According to this publication, a button to operate the added function is added to a remote controller. A television also disclosed in this publication is added with buttons, e.g., buttons of genres 1 to 9, a genre registration button, and a timer reservation button. If buttons are thus added, a huge number of buttons have to be provided.

Some conventional remote controllers have a small display. For example, when a menu key of a remote controller is selected, a menu according to upper classification is displayed. Further, a menu according to middle classification, an aimed select item, or the like is selected from the displayed menu. By thus hierarchizing select items, a large number of functions can be set. However, a search for an aimed item on the small display may be a burden to users.

The present invention has been made in view of the above problems, and it is desirable to provide a control signal input system which can be intuitively operated by users, and a control signal input method thereof.

SUMMARY OF THE INVENTION

According to the present invention, there is provided a control signal input system including a display device which displays a graphical user interface including plural control items for controlling a device, the control items being displayed in a predetermined layout; and an input device having an input unit operable to make a selection from control items displayed on the display device, the input unit having a shape, wherein the shape of the input unit corresponds to the layout of the control items.

According to the present invention, there is provided a control signal input method for use in a control signal input system including a display device which displays a graphical user interface, and an input device having an input unit operable to make a selection from control items displayed on the display device, the input unit having a shape, the method including generating a graphical user interface on the display device, the graphical user interface including control items for controlling a device, the control items having a layout which corresponds to the shape of the input unit; transmitting input contents of the input unit to the display device; and generating a graphical user interface on the display device showing which control item has been selected based on the input contents.

According to the control signal input system to which the present invention is applied, the layout of control items displayed on the display device and the shape of the input unit of the input device correspond to each other. Therefore, an intuitive selection from the control items displayed on the display device can be made sensing the shape of the input unit.

DETAILED DESCRIPTION

Figure 1:
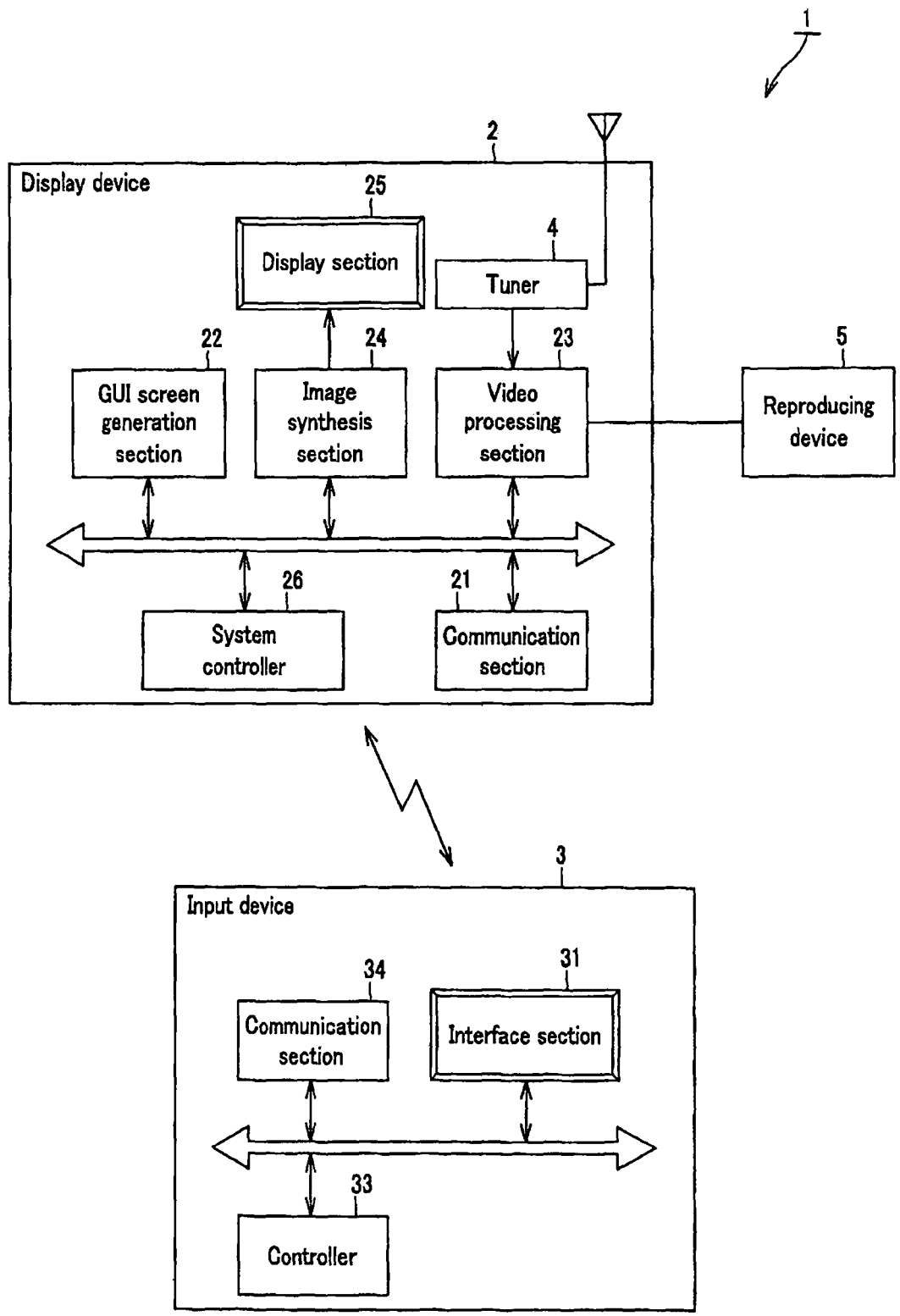
FIG. 1 is a block diagram showing a structure of a control signal input system.

Hereinafter, a control signal input system 1 to which the present invention is applied will now be described with reference to FIG. 1. The control signal input system 1 includes a television 2 which displays control items, and an input device 3 to select control items displayed on the television 2.

The television 2 is connected to a terrestrial antenna and/or a satellite television antenna. The television 2 converts video signals received by these antennae into video signals reproducible by a tuner 4. The converted signals are displayed on a display section. Also, the television 2 is connected to a reproducing device 5 such as a DVD player, VTR (Video Tape Recorder), HDD (Hard Disc Drive) player, or the like. An input to the television 2 may be switched to display video signals reproduced by the reproducing device 5.

The input device 3 outputs an operation instruction input from a user to the television 2. The television 2 displays a GUI (Graphical User Interface) screen on which select items are arranged by the input device 3. The shape of an interface section 31 of the input device 3 is similar to the layout of select items on the GUI screen. For example, if the interface section 31 of the input device 3 has a circular shape, the select items of the GUI screen are also arranged in a circular shape. Otherwise, if the interface section 31 of the input device 3 has a rectangular shape, the select items of the GUI screen are arranged in a rectangular shape.

The user operates the input device 3, checking the GUI screen. Basically, neither indication nor printing indicative of input contents is given on the interface section 31 of the input device 3. Even if input contents are not indicated on the input device 3, varieties of input contents can be widened by displaying input contents on the GUI screen. If software which generates the GUI screen is overwritten, items to be displayed on the GUI screen can be added or deleted easily, and the number of pages constituting the GUI screen to be used can be changed easily, too.

Figure 2:
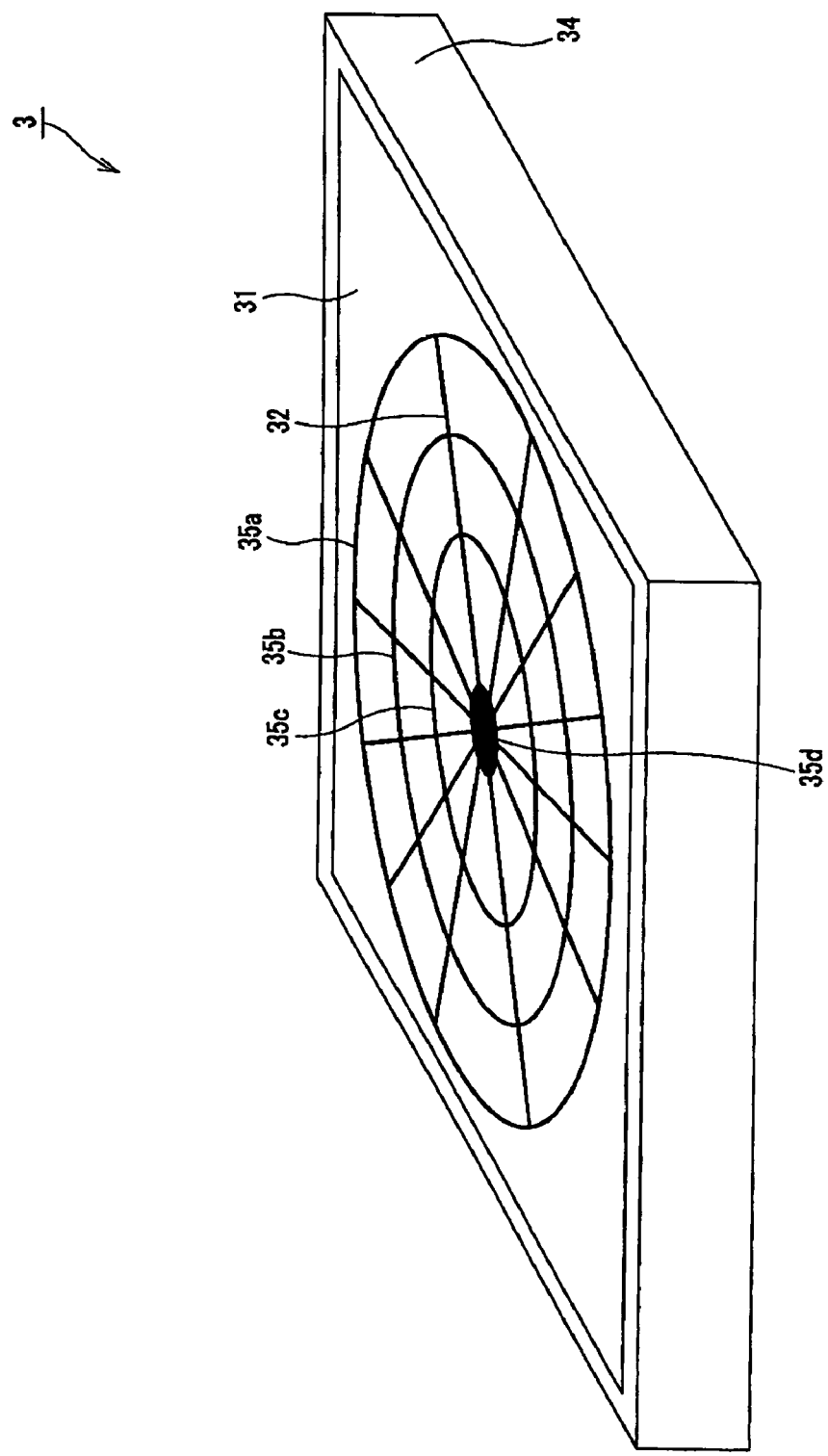
FIG. 2 is a perspective view showing an outer appearance of an input device.

FIG. 2 shows an outer appearance of the input device 3. The interface section 31 is provided at the top of the input device 3. The interface section 31 is exposed to the outside of the input device 3 through an opening portion of a casing 34. For example, a touch panel can be used as the interface section 31. The interface section 31 can detect XY coordinates (two-dimensional position) of a contact point when a contact object such as a fingertip or a pen tip contacts the surface of this interface section. Simultaneously, the interface section 31 can also detect a contact pressure thereof.

Figure 3:
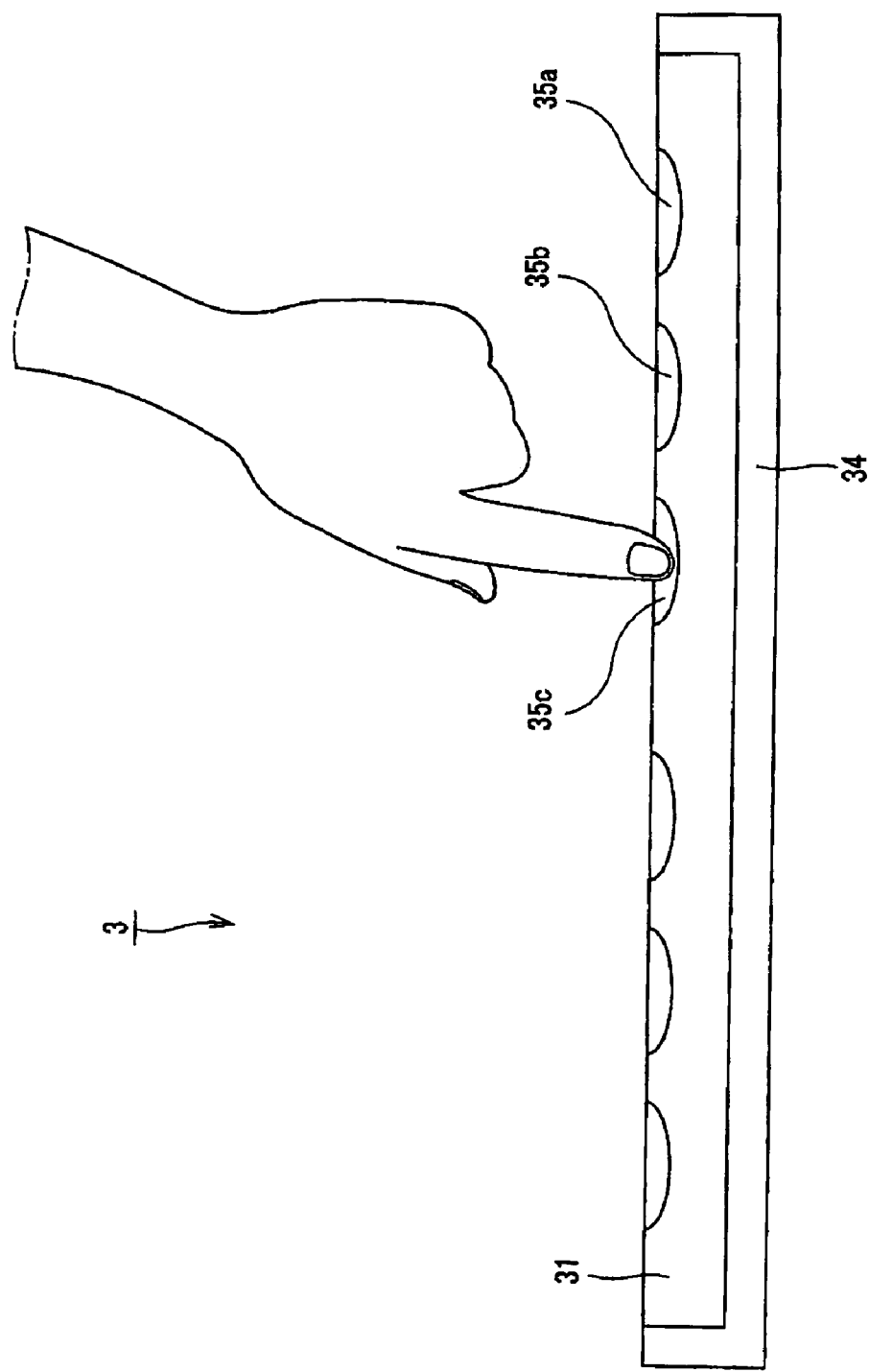
FIG. 3 is a cross-sectional view of the input device.

The interface section 31 transmits the sensed positional information and contact pressure of the fingertip to the television 2. Circular grooves 35 are formed in the interface section 31. There are total three circular grooves, e.g., large, intermediate, and small circular grooves. The outermost circumferential groove 35a surrounds the intermediate groove 35b. The intermediate groove 35b surrounds the innermost circumferential groove 35c. Inside the innermost circumferential groove 35c, a recess 35d is provided. The user touches the grooves 35a, 35b, and 35c by a fingertip, to input data, as shown in FIG. 3. Guide grooves 32 to guide the user's fingertip are provided bridging the recess 35d and the grooves 35a, 35b, and 35c. Twelve guide grooves 32 are provided extending radially from the recess 35d. The user can sense which area of the circles each divided into twelve areas the fingertip currently touches. By moving the fingertip along the guide grooves 32, the user can jump to a non-adjacent area, e.g., to an area existing on a diagonal line extending from the area currently selected.

The interface section 31 outputs positional information of the user's fingertip to a communication section 34. For example, a asynchronous scheme is adopted in communications with the television 2. The asynchronous scheme is a kind of synchronous scheme adopted between a personal computer and a mouse. The communication section 34 sequentially transmits data in accordance with motion of the fingertip without synchronization with the communication section 21 of the television 2.

The television 2 includes a communication section 21, a GUI screen generation section 22, a video processing section 23, a screen synthesis section 24, a display section 25, and a system controller 32. The communication section 21 receives data from the input device 3. The GUI screen generation section 22 generates GUI screens. The video processing section 23 performs noise reduction and image quality adjustment on video signals inputted from the tuner 4 and the reproducing device 5. The screen synthesis section 24 synthesizes video signals inputted from the video processing section 23 with GUI screens. The display section 25 displays a video inputted from the screen synthesis section 24. The system controller 32 controls the whole television 2.

Figure 4:
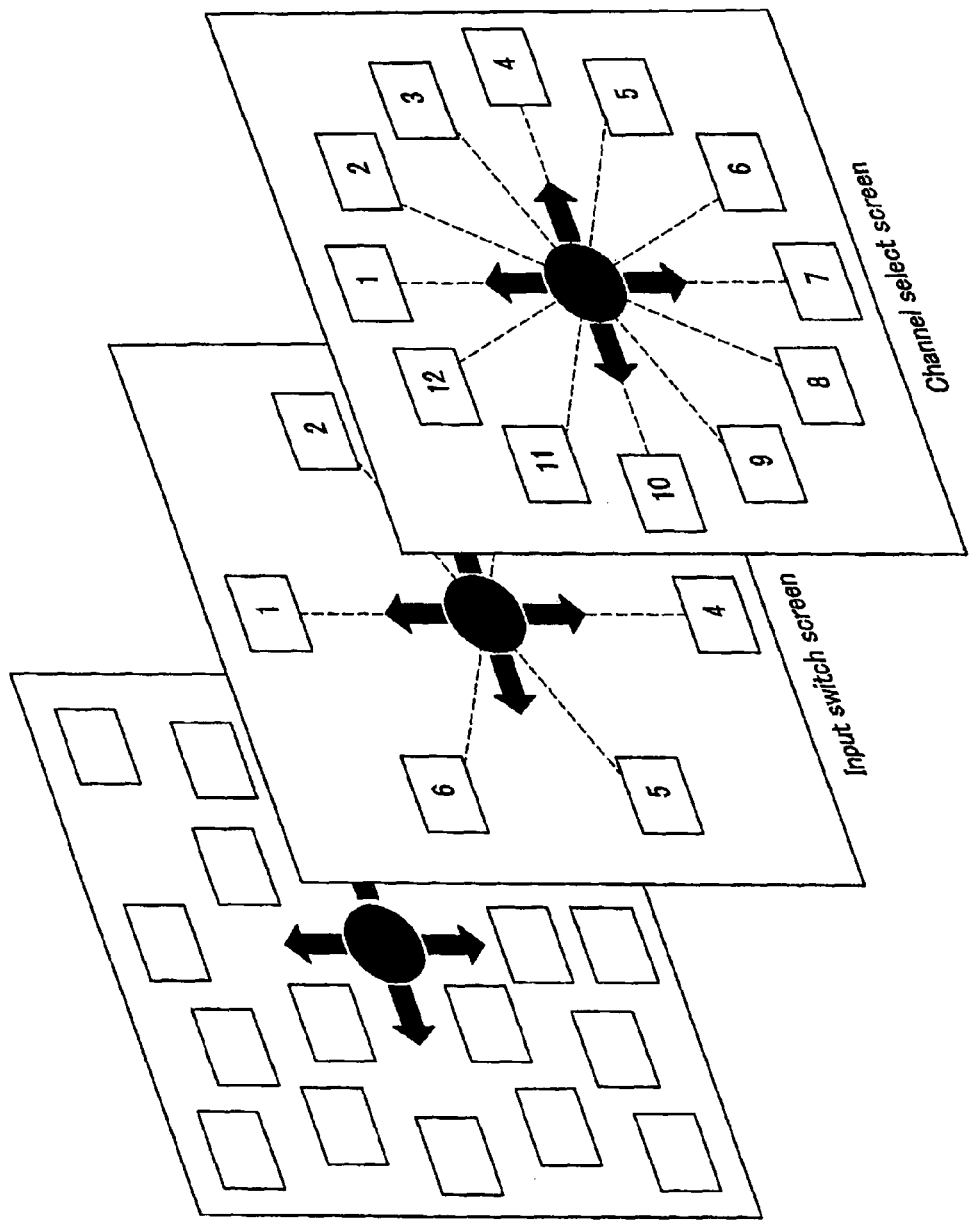
FIG. 4 shows a hierarchical structure of GUI screens.

The GUI screen generation section 22 generates a GUI screen in response to an input from the input device 3. The GUI screen has a hierarchical structure. FIG. 4 shows the hierarchical structure of the GUI screen. In FIG. 4, the front screen is a GUI screen as the first layer. The center screen is a GUI screen as the second layer. The rear screen is a GUI screen as the third layer. The screen as the first layer is a channel select screen. The screen as the second layer is an input switch screen. The screen as the third layer is a content select screen. The input switch screen is a screen to select an input source of a video signal to be displayed on the display section 25. On the channel select screen, select items are arranged in twelve directions. In contrast, on the input switch screen, select items are arranged in six directions. The number of select items arranged in one circle can be arbitrarily changed. The input switch screen displays types of the tuner 4 and the reproducing device 5 connected to the television 2, e.g., video, DVD, terrestrial TV broadcasting, satellite broadcasting, and the like. A particular GUI screen is linked to another GUI screen. Transfer from a displayed GUI screen to a linked GUI screen is possible.

Figure 5:
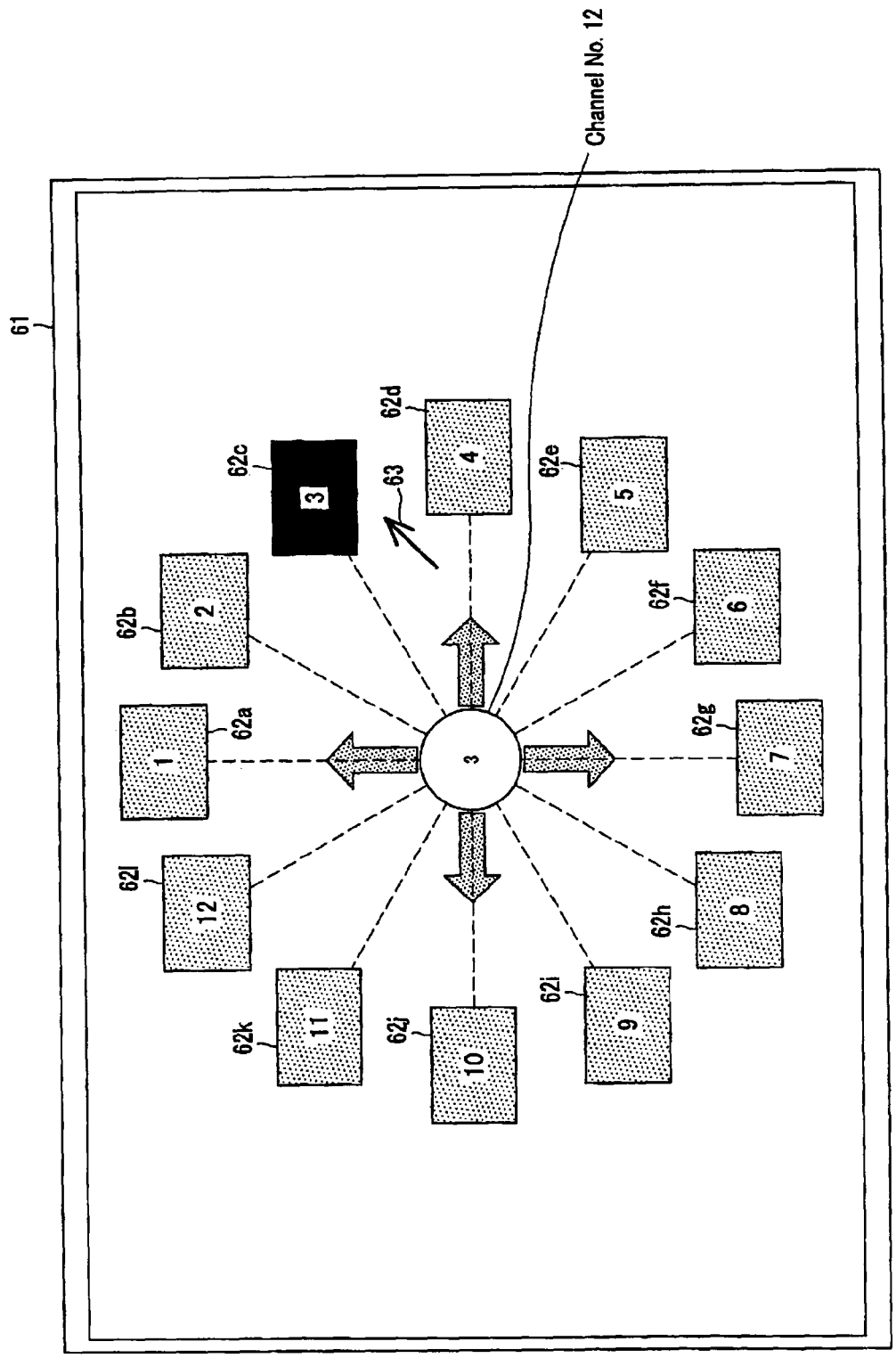
FIG. 5 shows a channel select screen.

The GUI screen generation section 22 outputs a generated GUI screen to the screen synthesis section 24. The screen synthesis section 24 synthesizes the GUI screen with a video signal inputted from the tuner 4 or the reproducing device 5, and outputs a synthesis result to the display section 25. Suppose now that a channel select screen is displayed as a GUI screen. FIG. 5 shows an example of the channel select screen 61. On the GUI screen 61, channels 62a to 62l of ch-1 to ch-12 are arranged on a circle. At the center of the circle, the number of the channel currently selected is displayed. The display area of the selected channel is inverted so that which channel is currently selected can be seen. The video on the selected channel is displayed as a backdrop of the GUI screen 61. In this figure, the channel 3 is selected.

Figure 6:
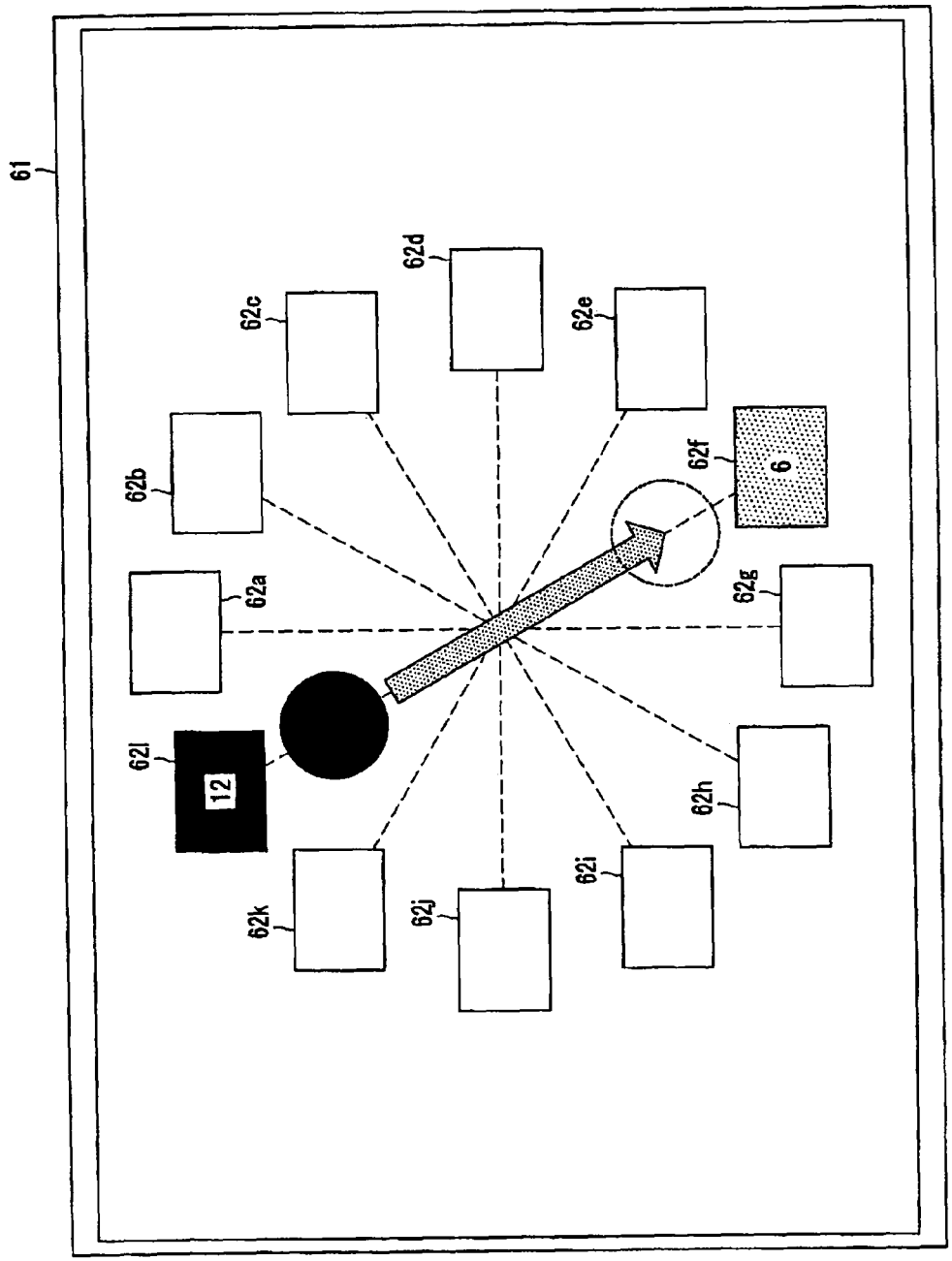
FIG. 6 shows a state where a channel is switched along a guide groove.

The GUI screen 61 displays a cursor 63 indicating where on the interface section 31 the user's fingertip touches. The user moves the cursor 63 checking the position of the user's own fingertip. The position of the cursor 63 on the GUI screen 61 one-to-one corresponds to the position of the user's fingertip on the interface section 31. When the user's finger tip contacts a groove in the interface section 31, the backdrop of the GUI screen 61 switches to a channel corresponding to the position of the user's fingertip. As the user's fingertip slides along a circular groove, channels switch one after another in accordance with the position of the fingertip. If the user's fingertip is moved along a guide groove 32, the cursor can be moved even to an opposite coordinate axis by one action, as shown in FIG. 6.

Some conventional interfaces are called selective interfaces. A typical selective interface is mouse operation of personal computers. In mouse operation, a cursor is moved to an aimed icon, and execution is instructed by a click.

Unlike the selective interface, the input device 3 switches channels when the user moves the fingertip, without an instruction of execution. This kind of interface will be hereinafter referred to as a seamless interface. More intuitive operation is available with the seamless interface than with the selective interface.

Figure 7:
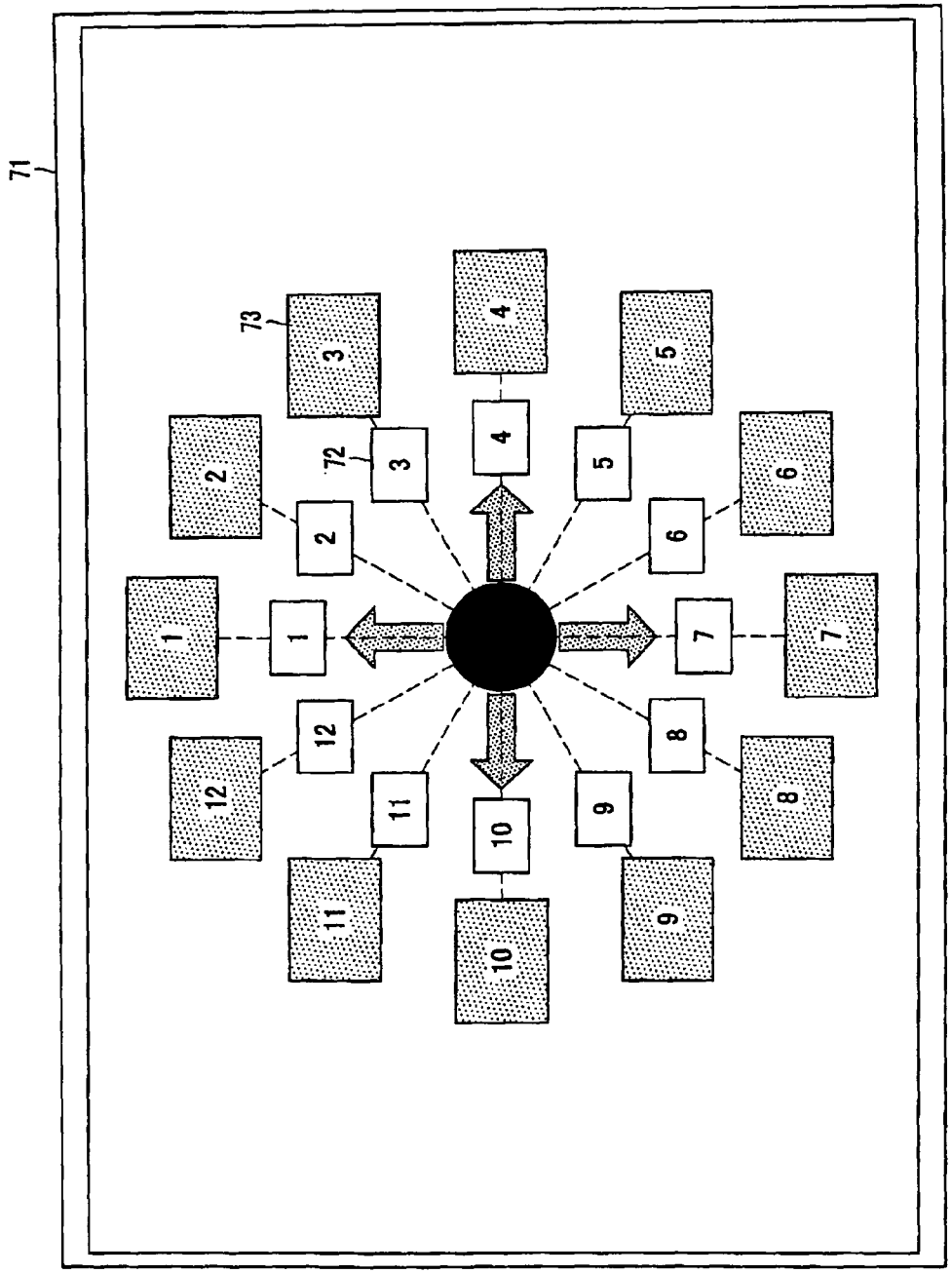
FIG. 7 shows a channel select screen which enables a selection from satellite broadcasting channels and terrestrial broadcasting channels on one single screen.

Next, a modification of the GUI screen will be described. On the GUI screen 71 shown in FIG. 7, select items are arranged on double circles. Terrestrial broadcasting channels are arranged along the inner circle, as well as satellite broadcasting channels along the outer circle. Since triple grooves 35a, 35b, and 35c are formed in the interface section 31, satellite broadcasting channels can be selected by the innermost circumferential groove 35c among the three grooves 35a, 35b, and 35c. Terrestrial broadcasting channels can be selected by the intermediate two grooves 35b. When the user operates the GUI screen, the user can make selection on one single screen by distinguishing the groove along which the satellite broadcasting channels are arranged from the other groove along which the terrestrial broadcasting channels are arranged, based on touch sense of the fingertip.

Figure 8:
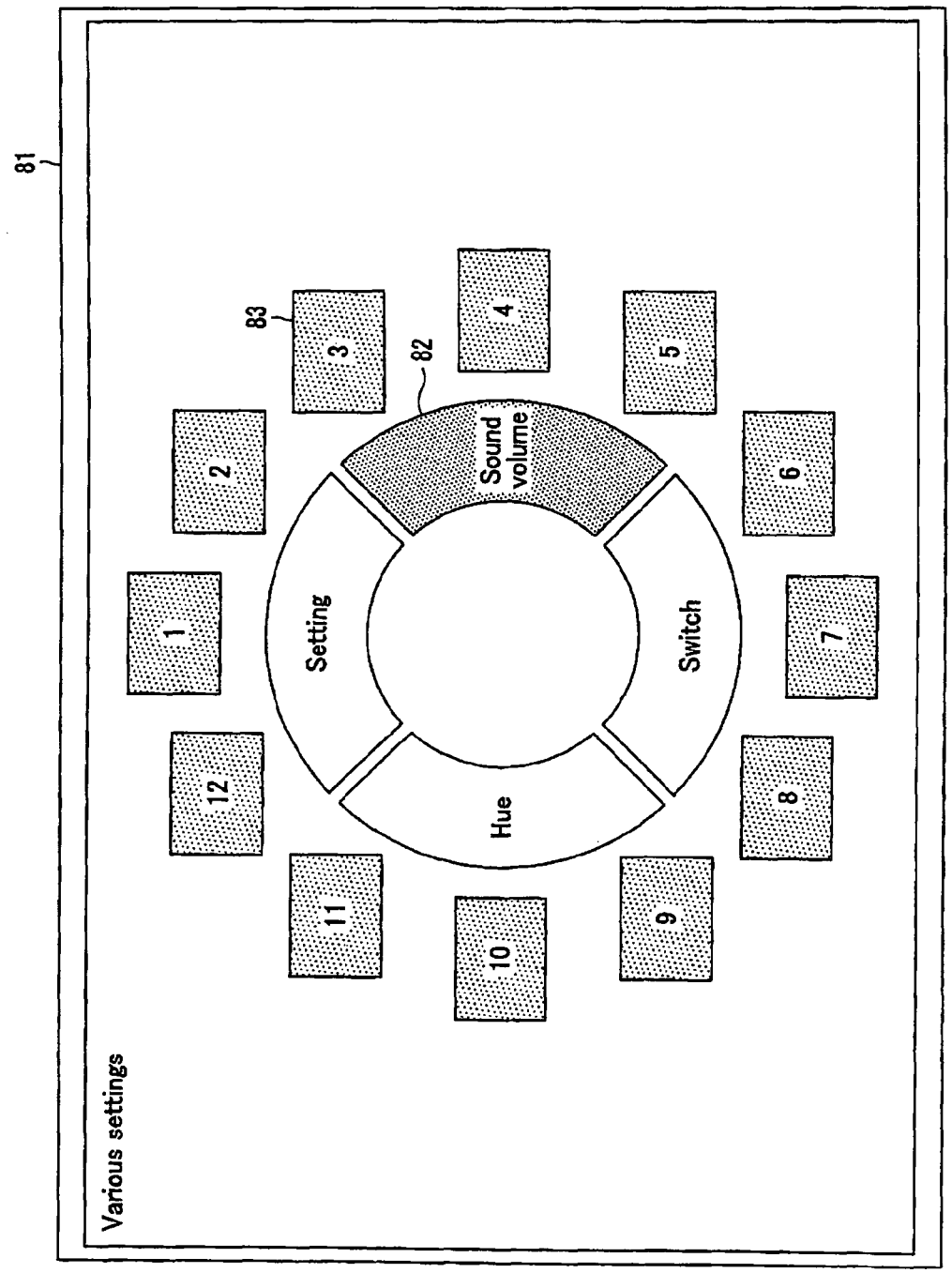
FIG. 8 shows a GUI screen on which different kinds of select items can be selected on one single screen.

On the GUI screen 81 shown in FIG. 8, select items of different categories are arranged along an innermost circumferential circle 82 and an intermediate circle 83. On the GUI screen 81 shown in FIG. 8, setting items are arranged along the innermost circumferential circle 82, and channel numbers are arranged along the intermediate circle 83.

Four items of "Setting", "Hue", "Switch", and "Soundvolume" are arranged as select items along the innermost circumferential circle 82. When the item "Switch" is selected, the GUI screen transfers to an input switch screen to select an input source. On the input switch screen, types of the tuner 4 and the reproducing device 5 connected to the television 2, e.g., video, DVD, terrestrial TV broadcasting, satellite broadcasting, and the like, can be selected. When the item "Hue" is selected, the GUI screen transfers to a screen to select a hue. When the item "Setting" is selected, the GUI screen transfers to a setting item select screen. On the setting item select screen, contrast or brightness can be selected. When the item "Sound volume" is selected, the GUI screen transfers to a volume display screen.

Figure 9:
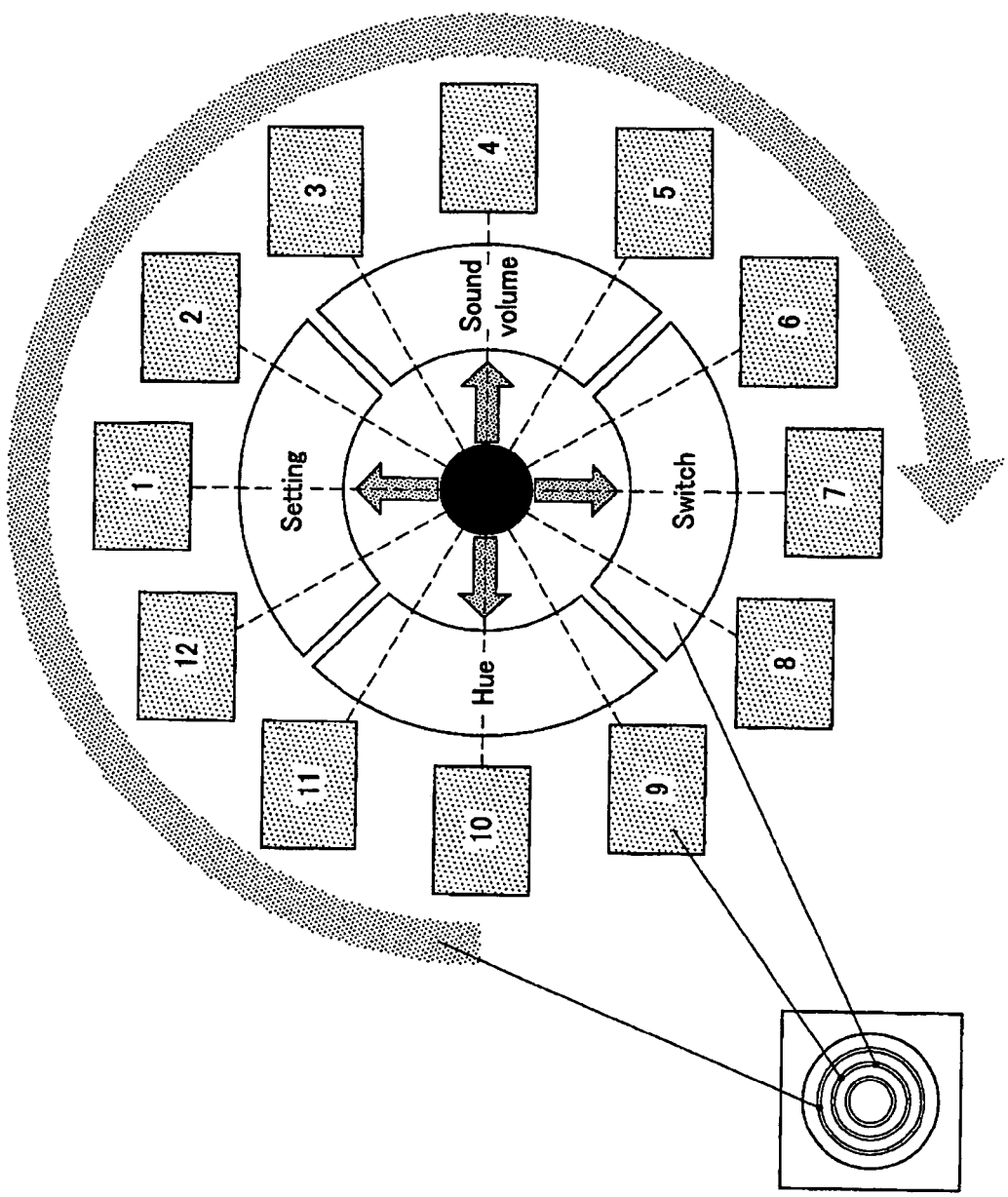
FIG. 9 shows a state where a fingertip slides along the outermost circumferential groove.

Operations along the outermost circumferential groove 35a may be assigned to "Forward" and "Backward". As shown in FIG. 9, an image being displayed can be fed forward or rewound backward by sliding a fingertip on the outermost circumferential groove 35a. The contents of operations on the outermost circumferential groove 35a are not displayed on the GUI screen.

Limitations are given to operations on the innermost circumferential circle 35c and the outermost circumferential groove 35a. By thus setting limitations, execution is not started even when the user happens to touch the groove 35a or 35c by mistake. A limitation is, for example, a threshold value for pressure with which the interface section 31 is pressed or a waiting time until execution is started after having sensed a touch. More specifically, the following limitations are given. That is, execution is started upon elapse of two seconds after a touch by a fingertip on a select item along the innermost circumferential circle 82. Alternatively, execution is not started before a display area of a select item along the innermost circumferential circle 82 is pressed with a predetermined pressure or more. Further, operations on the outermost circumferential groove may be given a limitation that the operation "Forward" or "Backward" is started when a user's fingertip slides 90 degrees or more per second on the groove 35a.

Switching of channels along the intermediate groove 35b may be the most frequently used operation among operations of the television 2. The frequently used channel switching adopts a seamless interface, so that execution is started by simply touching the groove by a fingertip. A limitation for start of execution is given to each of contents of operations. Therefore, different contents of operations displayed on the same GUI screen 81 can be selected individually from each other.

The interface section 31 can also be used like a cross key. When operating the interface section 31 like a cross key, the center recess 35d is taken as a neutral position. As a fingertip is moved in any direction from the neutral position, a cursor on the GUI screen moves in the moving direction of the fingertip.

Figure 10:
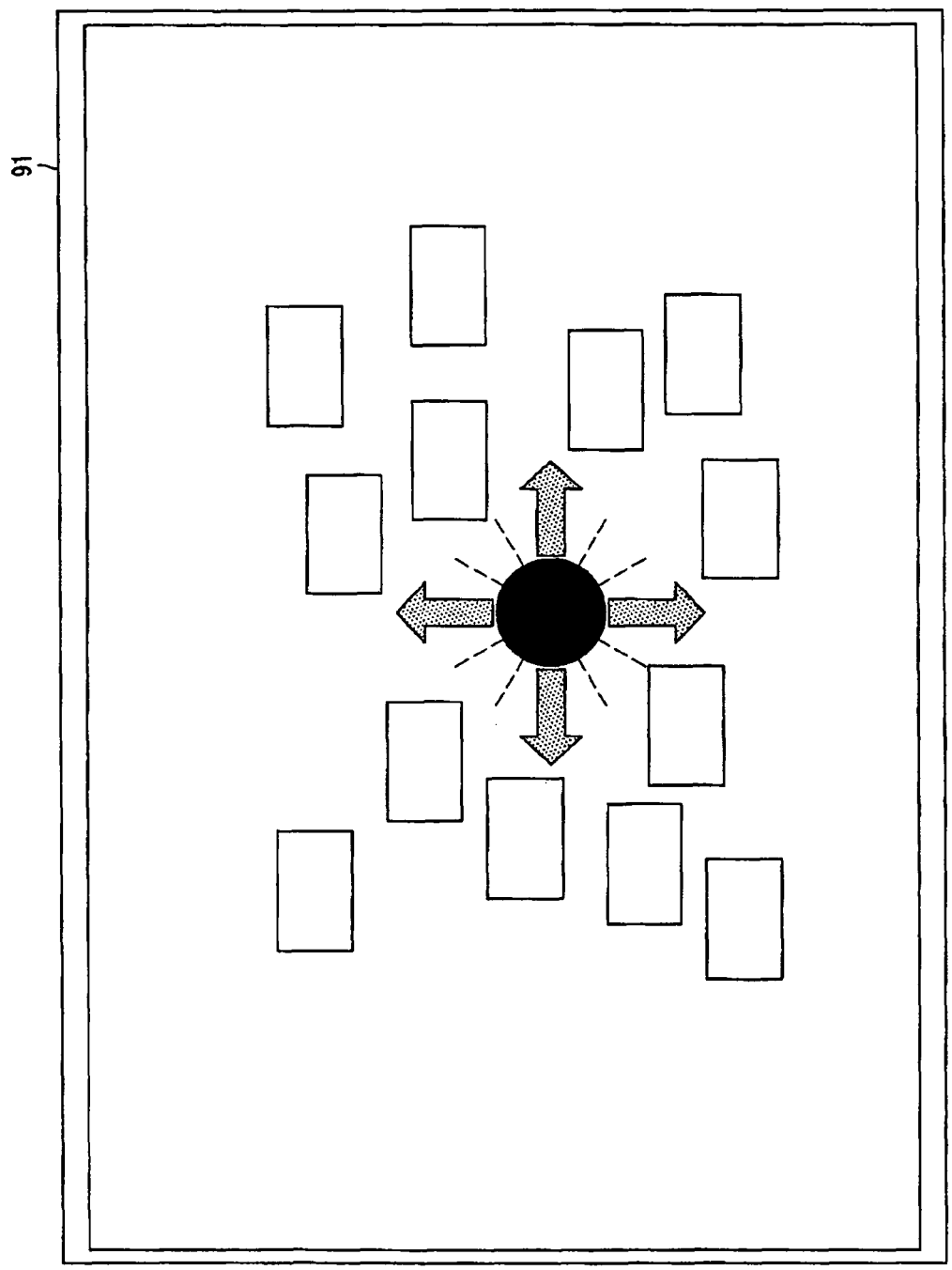
FIG. 10 shows a GUI screen when select items are arranged at free coordinates.

Further, a GUI screen whose shape is not similar to the grooves 35a, 35b, and 35c may be mixed in the plural GUI screens may be included. For example, in case of the GUI screen shown in FIG. 10, select items are arranged at free coordinates, there is no relationship between the shapes of the grooves 35a, 35b, and 35c and the layout of the select items. This kind of GUI screen can be more efficiently operated by dealing with the interface section 31 like a cross key than by moving a fingertip along grooves. The GUI screen generation section 22 also has a function to switch properly input modes in correspondence with the shapes of GUI screens.

As has been described above, in the control signal input system 1 to which the present invention is applied, the input device 3 has circular grooves. The display section 25 of the television 2 displays GUI images which visually represent contents of inputs available by the input device 3. The GUI images are arranged on circular shapes similar to the shapes of the grooves. As the user moves a fingertip along the grooves, a cursor on the GUI images also moves on circles in accordance with motion of the fingertip.

Thus, according to the control signal input system 1, the shape of the input section of the input device 3 and the layout of the GUI screen are arranged to correspond to each other. Therefore, the user can intuitively operate the input device 3.

Since guide grooves are provided bridging the circular grooves and a recess, the user can sense where on the grooves the user's own fingertip touches. Further, a jump to a distant area existing on a diagonal line of the circles is available by moving the fingertip along the guide grooves. The interface section 31 can be used like a cross key by utilizing the center recess and the guide grooves.

Figure 11:
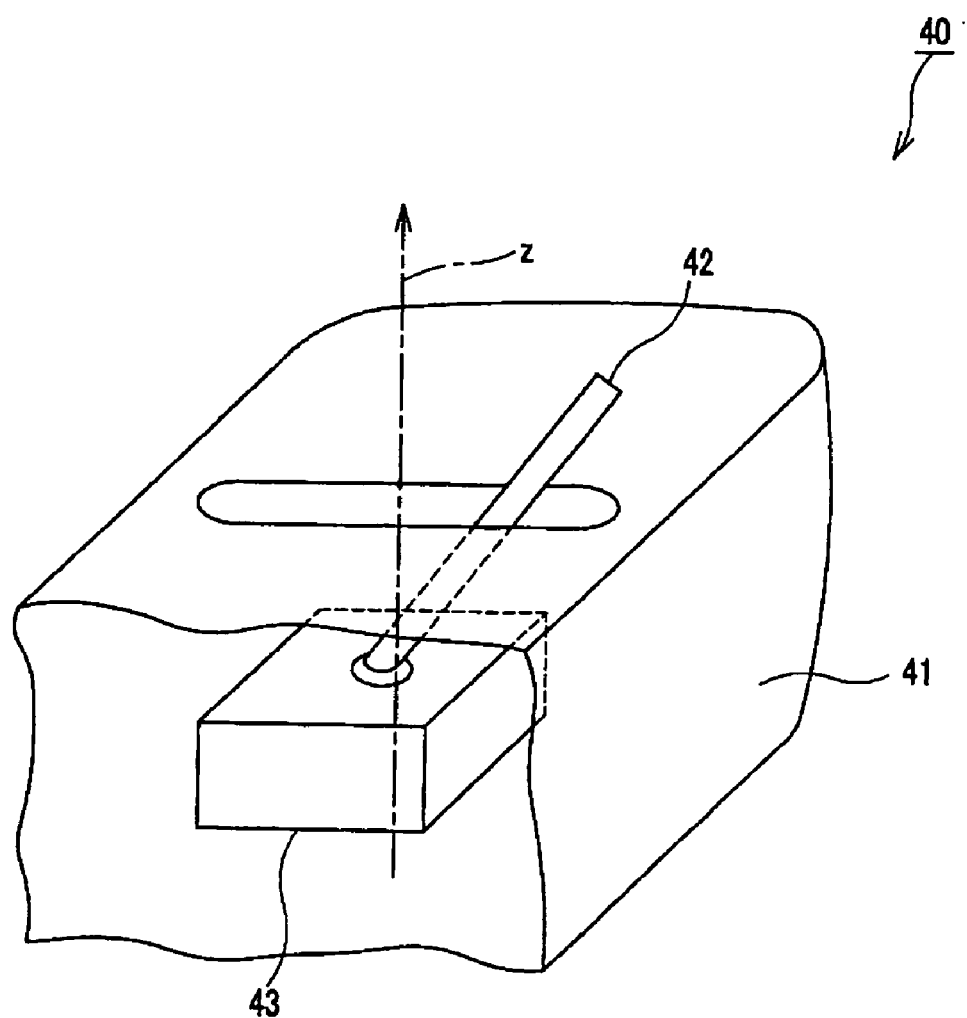
FIG. 11 is a view showing a structure of a joy stick.
Figure 12:
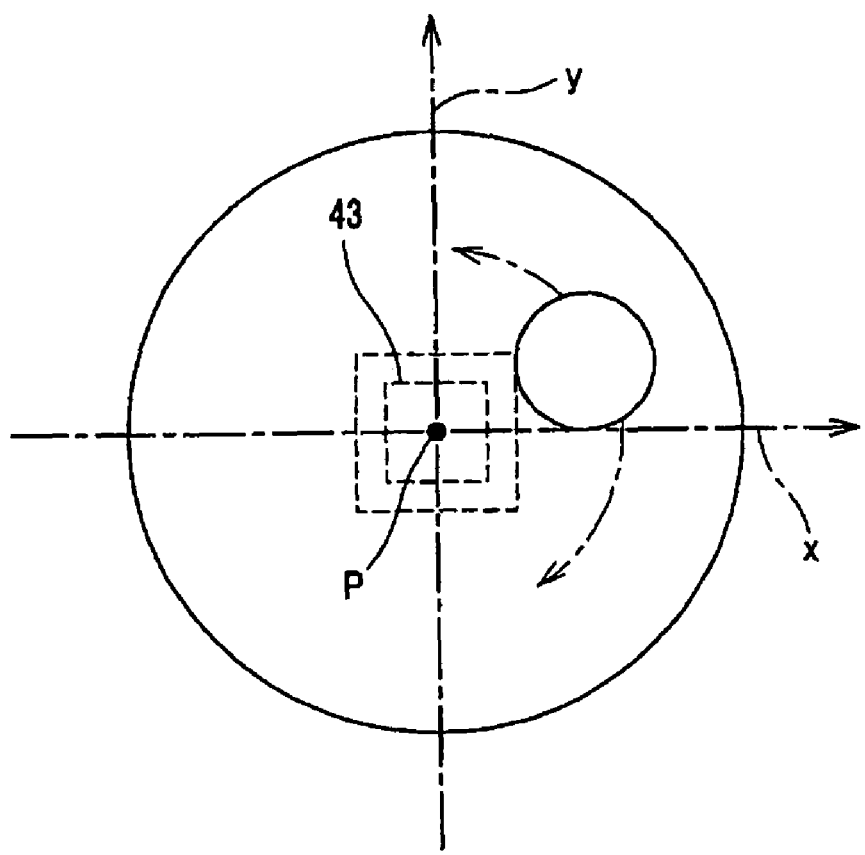
FIG. 12 shows a movable range of the joy stick.

In the control signal input system to which the present invention is applied, a joy stick 40 can be used as an input device. The joy stick 40 is constituted by a base section 41 and a stick member 42, as shown in FIG. 11. The stick member 42 is supported by the base section 41. The stick member 42 takes as a neutral position a position where the stick member 42 stands vertically in a Z-axis direction which is the vertical axis of the base section 41. The stick member 42 can be freely pivoted about the Z-axis, kept tilted to a predetermined angle from the Z-axis. As shown in FIG. 12, the base section 41 has an operating position detection section 43 constituted by a direction detection section and an inclination detection section. The direction detection section detects the direction in which the stick member 42 is tilted on the xy coordinate system. The inclination detection section detects an inclination θ of the stick member from the Z-axis. The xy coordinates and inclination detected by the operating position detection section 43 are outputted to the display device 2 via the communication section 34.

A GUI screen generated at this time by the display device 2 corresponds to the movable range of the stick member 42. The movable range of the stick member 42 is the inside of a circle centering on a neutral position P. On the GUI screen operated by the stick member 42, select items are arranged in a circular layout like on the GUI screens shown in FIGS. 5 to 9.

In a modification example of the control signal input system 1, another electronic device than the television 2 may be operated. In this case, the television 2 is used as a display device to display contents of operations by the input device 3. Electronic devices as targets to be operated by the input device 3 may be, for example, AV devices such as a DVD player and an audio player, home electronics such as an air conditioner and a washing machine.

It should be understood by those skilled in the art that various modifications, combinations, sub-combinations and alterations may occur depending on design requirements and other factors insofar as they are within the scope of the appended claims or the equivalents thereof.

The invention claimed is:

1. A control signal input system, comprising: a display device which displays a graphical user interface including plural control items for controlling a device, the control items being displayed in a predetermined layout; and an input device having an input unit operable to make a selection from the control items displayed on the display device, the input unit having a shape, wherein the shape of the input unit corresponds to the layout of the control items, the input unit includes plural circular grooves, a center recess, and plural guide grooves, in which the center recess is surrounded by the plurality of circular grooves, the recess and the circular grooves are arranged so as to be recessed relative to the plural guide grooves, the control items on the graphical user interface are arranged in a positional relationship corresponding to shapes of the grooves, one or more of the circular grooves or the guide grooves enable a user to sense a respective position by touching, and each of the plural circular grooves having a circular shape and being arranged such that one of the circular grooves surrounds another one of the circular grooves and being further arranged so as to be recessed in the input unit relative to an upper surface thereof, and each of the guide grooves being arranged so as to bridge the center recess and each of the circular grooves and extend radially outward from the center recess of the input unit across each of the circular grooves in a straight line so as to divide each of the circular grooves into a plurality of areas each being recessed relative to the upper surface of the input unit.

2. The system according to claim 1, wherein the input unit detects a position on the plane where a user's fingertip touches and a pressure applied by the user's fingertip.

3. The system according to claim 1, wherein the grooves are assigned to selections of plural functions of the device.

4. The system according to claim 1, in which a predetermined limitation is associated with a number of the circular grooves such that an execution of a desired selection is started only after the predetermined limitation for a respective circular groove corresponding to the desired selection is satisfied.

5. The system according to claim 4, in which the predetermined limitation is a predetermined pressure exerted on a portion of the respective circular groove corresponding to the desired selection.

6. The system according to claim 4, in which the predetermined limitation is a predetermined time.

7. The system according to claim 4, in which the predetermined limitation is a predetermined amount of movement per time across a respective circular groove.

8. The system according to claim 1, in which the plural circular grooves include a first circular groove and a second circular groove, and in which a first predetermined limitation is associated with the first circular groove and a second predetermined limitation which is different from the first predetermined limitation is associated with the second circular groove such that an execution of a desired selection or a desired operation is started only after the respective one of the first predetermined limitation or the second predetermined limitation for the respective one of the first circular groove or the second circular groove corresponding to the desired selection or operation is satisfied.

9. The system according to claim 8, in which the first predetermined limitation is a predetermined pressure exerted on a portion of the first circular groove and the second predetermined limitation is a predetermined amount of movement per time across the second circular groove.

10. The system according to claim 8, in which the first predetermined limitation is a predetermined time and the second predetermined limitation is a predetermined amount of movement per time across the second circular groove.

11. The system according to claim 1, wherein the input unit is configured to detect a position on the circular grooves of the input unit where a user touches and to determine whether a pressure applied thereat by a touch exceeds a predetermined value, and wherein, during operation, upon detection of a respective position on the circular grooves due to a respective touch the input unit causes a change to occur in an image being displayed on the display device and upon detection of a respective pressure which exceeds the predetermined value the input unit causes an execution of a function corresponding to the respective position to be started.

12. The system according to claim 11, wherein the respective touch corresponding to the detection of the position on the circular grooves where the user touched has a pressure associated therewith which is less than the predetermined value.

* * * * *